United States Patent [19]

Evans

[11] 4,414,957

[45] Nov. 15, 1983

[54] FIREPLACE AND STOVE APPARATUS

[75] Inventor: Jeffrey L. Evans, Aspen, Colo.

[73] Assignee: Ting Enterprises, Inc., Aspen, Colo.

[21] Appl. No.: 359,061

[22] Filed: Mar. 17, 1982

[51] Int. Cl.³ .............................................. F24B 7/00
[52] U.S. Cl. .................................... 126/121; 126/112; 126/163 R; 237/51; 165/174
[58] Field of Search .................. 126/121, 110 E, 131, 126/109, 143, 112, 139, 163 A, 163 R; 165/175, 174, 39, 40; 237/2 A, 51, 52, 53, 55; 236/DIG. 9; 110/190, 300

[56] References Cited

U.S. PATENT DOCUMENTS

| | | | |
|---|---|---|---|
| 391,082 | 10/1888 | Sargent et al. | 126/163 R |
| 493,056 | 3/1893 | Beehler . | |
| 606,667 | 7/1898 | Humphreys . | |
| 757,348 | 4/1904 | Ross . | |
| 964,344 | 7/1910 | Walton . | |
| 1,030,002 | 6/1912 | Livingston . | |
| 1,252,176 | 1/1918 | Read . | |
| 1,313,085 | 8/1919 | Greene . | |
| 1,371,390 | 3/1921 | Olds . | |
| 1,434,228 | 10/1922 | Sanborn . | |
| 1,527,999 | 3/1925 | Thomas . | |
| 1,537,736 | 5/1925 | Bennett . | |
| 1,640,771 | 8/1927 | Hannum . | |
| 2,079,157 | 5/1937 | De Lin | 237/2 R |
| 2,243,503 | 5/1941 | Frenette . | |
| 2,258,882 | 10/1941 | Craig | 126/121 |
| 2,258,882 | 10/1941 | Craig . | |
| 2,274,341 | 2/1942 | Mueller | 126/121 X |
| 2,297,776 | 10/1942 | Kelley et al. . | |
| 2,349,834 | 8/1944 | Mueller . | |
| 2,585,523 | 2/1952 | Wellman . | |
| 2,619,022 | 11/1952 | Hergenrother . | |
| 2,707,946 | 5/1955 | Merryweather et al. | 126/140 |
| 2,814,287 | 11/1957 | Shults . | |
| 3,001,521 | 9/1961 | Reilly . | |
| 3,269,383 | 8/1966 | Maasberg . | |
| 3,469,570 | 9/1969 | Wright . | |
| 3,517,660 | 6/1970 | Springer et al. . | |
| 3,635,211 | 1/1972 | Englert . | |
| 3,724,535 | 4/1973 | Sapir . | |
| 3,726,473 | 4/1973 | Sapir . | |
| 3,756,218 | 9/1973 | Simpson . | |
| 3,771,511 | 11/1973 | Dahlquist . | |
| 3,901,212 | 8/1975 | Stites . | |
| 3,913,558 | 10/1975 | Caldwell . | |
| 3,942,509 | 3/1976 | Sasser . | |
| 3,945,369 | 3/1976 | Adams et al. . | |
| 3,955,553 | 5/1976 | Soeffker . | |
| 3,976,048 | 8/1976 | Ashman, Jr. . | |
| 4,008,703 | 2/1977 | Allgood . | |
| 4,008,706 | 2/1977 | Buanno . | |
| 4,010,729 | 3/1977 | Egli . | |
| 4,018,270 | 4/1977 | Kolinger et al. . | |
| 4,019,492 | 4/1977 | Rush . | |
| 4,020,824 | 5/1977 | Dodson . | |
| 4,026,263 | 5/1977 | Boyd | 126/121 |
| 4,043,313 | 8/1977 | Sherman | 126/121 |
| 4,058,107 | 11/1977 | Edwards . | |
| 4,060,196 | 11/1977 | Goldsby et al. . | |
| 4,062,345 | 12/1977 | Whiteley . | |
| 4,069,808 | 1/1978 | Cranberg . | |
| 4,091,794 | 5/1978 | Stites . | |
| 4,095,581 | 6/1978 | Billmeyer et al. | 126/121 |
| 4,108,144 | 8/1978 | Wilhoite . | |
| 4,117,824 | 10/1978 | McIntire et al. . | |
| 4,119,081 | 10/1978 | Edwards . | |
| 4,120,281 | 10/1978 | Wass . | |
| 4,129,112 | 12/1978 | Glasser et al. . | |
| 4,129,251 | 12/1978 | Goldsby et al. . | |
| 4,131,105 | 12/1978 | Moncrieff-Yeates . | |
| 4,137,896 | 2/1979 | Edwards . | |
| 4,163,442 | 8/1979 | Welty . | |
| 4,174,701 | 11/1979 | Gneiting | 126/121 |
| 4,175,539 | 11/1979 | McGuire . | |
| 4,217,878 | 8/1980 | Wieweck . | |
| 4,232,653 | 11/1980 | Otterpohl . | |
| 4,280,474 | 7/1981 | Ruegg, Sr. | 126/121 |
| 4,306,491 | 12/1981 | Reardon, Jr. | 126/126 X |

FOREIGN PATENT DOCUMENTS 1095644 12/1967 United Kingdom ................ 126/121

OTHER PUBLICATIONS

"Electric Controls for Refrigeration and Air Conditioning", B. C. Langley, FIGS. 9-7-9-8.
The Revolutionary ELCO Fireplace.
ELCO Fireplaces "They Pressurize" & Effectively Heat Your Entire Home.
Installation & Operating Instructions for ELCO Masonry Built-In Fireplace.

Installation & Operating Instructions for ELCO SS1-300 Fireplace Insert.
ELCO Fireplaces.

*Primary Examiner*—Samuel Scott
*Assistant Examiner*—Randall L. Green
*Attorney, Agent, or Firm*—Parkhurst & Oliff

[57] ABSTRACT

A fireplace or stove apparatus for efficiently providing heat to a structure without loss of interior air to the flue draft. A blower forces outside air through a conduit located in the exhaust flue into a grate located in a fireplace or stove. The fuel loading opening of the fireplace or stove is made substantially air-tightly sealed. An air opening in the grate provides air to be consumed by the fire. A second air opening in the grate is fluidly connected by means of a conduit to the structure to be heated.

19 Claims, 15 Drawing Figures

FIREPLACE AND STOVE APPARATUS

BACKGROUND OF THE INVENTION

1. Field of the Invention

This invention relates to an apparatus for use in a fireplace or stove, and more particularly, to an apparatus which allows the fuel-loading opening (and any other room air inlet) of the fireplace or stove to be sealed during combustion. The invention releates still more particularly to a fireplace apparatus which utilizes outside air for combustion purposes and also heats outside air and supplies it to the room in which the fireplace or stove is located.

2. Description of the Prior Art

In the past, fireplaces and stoves have utilized room air for combustion, resulting in the loss of heated room air to the outside, and increasing the infiltration of cold air which replaces that air lost up the flue. Fireplace inserts and the like have increased the efficiency of fireplaces, often at the expense of the natural beauty of the fireplace and fire, but usually do so merely by cycling room air through the fireplace apparatus and back into the room.

Sealed fireplaces which use outside combustion air to preserve warm room air and decrease cold air infiltration may also employ a heat exchanger to bring fresh, heated outside air into the room where the fireplace is located, thereby creating a positive pressure situation which increases comfort and facilitates a more even temperature distribution throughout the building being heated. Previous embodiments of this type of system have required that the combustion chamber possess at least one exterior wall in order to allow an opening for a source of outside air, or that ductwork be incorporated into the construction of the building to eliminate that requirement. As a consequence, and also due to the wide variety of dimensions and configurations which different solid fuel room heaters present, the conversion of existing combustion chambers into positive pressure furnaces has required difficult custom modifications employing unique solutions and installations in the case of fireplaces, and has been nearly impossible to achieve in the case of freestanding stove type heaters.

Also, prior devices have been deficient in the type of controls provided to regulate combustion in that they presume a level of involvement and knowledge on the part of the user which is rarely existent.

SUMMARY OF THE INVENTION

It is an object of this invention to provide a fireplace or stove apparatus which will allow sealing of the combustion chamber from room air.

It is a further object of this invention to provide a fireplace or stove apparatus wich heats outside air and supplies it to the room in which the fireplace or stove is located.

It is a still further object of this invention to provide a fireplace or stove apparatus which is readily adaptable for use in presently existing fireplace and stove systems.

It is a still further object of this invention to provide a fireplace or stove apparatus which can be modified to fit a variety of fireplace or stove sizes.

It is a still further object of this invention to provide a fireplace or stove apparatus which is of simple and economical construction, and which may be easily assembled and installed.

It is a still further object of this invention to provide a fireplace or stove apparatus in which an automatically adjusted rate of combustion reduces creosote build up and air pollution from under-firing, eliminates the safety hazard of over-firing, and concurrently responds to changes in actual and desired room air temperatures.

The above objects and others are obtained by providing a fireplace or stove apparatus which has a hollow grate with an air inlet and three types of air outlets. The air inlet is connected to a blower located outside of the fireplace or stove chimney by means of a flexible conduit. One air outlet is directed towards the opening of the fireplace, which is substantially air-tightly sealed by a glass door arrangement. The air from this outlet helps keep the glass free of soot, delivers secondary combustion air to the fire, and also decreases the temperature differential across the glass front (and thus the possibility of glass failure). The second air outlet is directed toward the fuel held by the grate to provide primary combustion air to the fire. The third outlet is exhausted through an opening in the sealed front of the fireplace to supply hot air to the room.

Thus, different blower speeds affect the fire temperature by varying the amount of combustion air supplied to the fire, while simultaneously changing the amount of hot air reaching the room to be heated. The blower is controlled by a thermostat, which increases the blower speed as the difference between the room temperature and a set desired temperature increases. Conversely, the blower speed decreases as the difference between the room temperature and the set desired temperature decreases. The controls stop operating the blower when the temperature of air heated by the fireplace decreases below a certain level, indicating the total consumption of fuel. The blower will operate at a pre-set minimum speed to ensure that at least some combustion air is provided for the fire, even when the room temperature is greater than or equal to the desired temperature. For safety purposes, the controls are provided with a cutoff which shuts the blower down when the fire temperature reaches a certain pre-set maximum temperature.

The grate is designed so that two or more grate subassemblies may be hooked together for use in various sizes of combustion chambers. Both the width and height of the grate may be varied.

When the apparatus is used for a fireplace, it is preferable that the fireplace opening be sealed with glass doors. The door frame is provided with a sealing flange, whose edge abuts the rim of the fireplace opening, and which may be trimmed to fit various sizes and shapes of fireplace openings.

DESCRIPTION OF A PREFERRED EMBODIMENT

Figure 1:
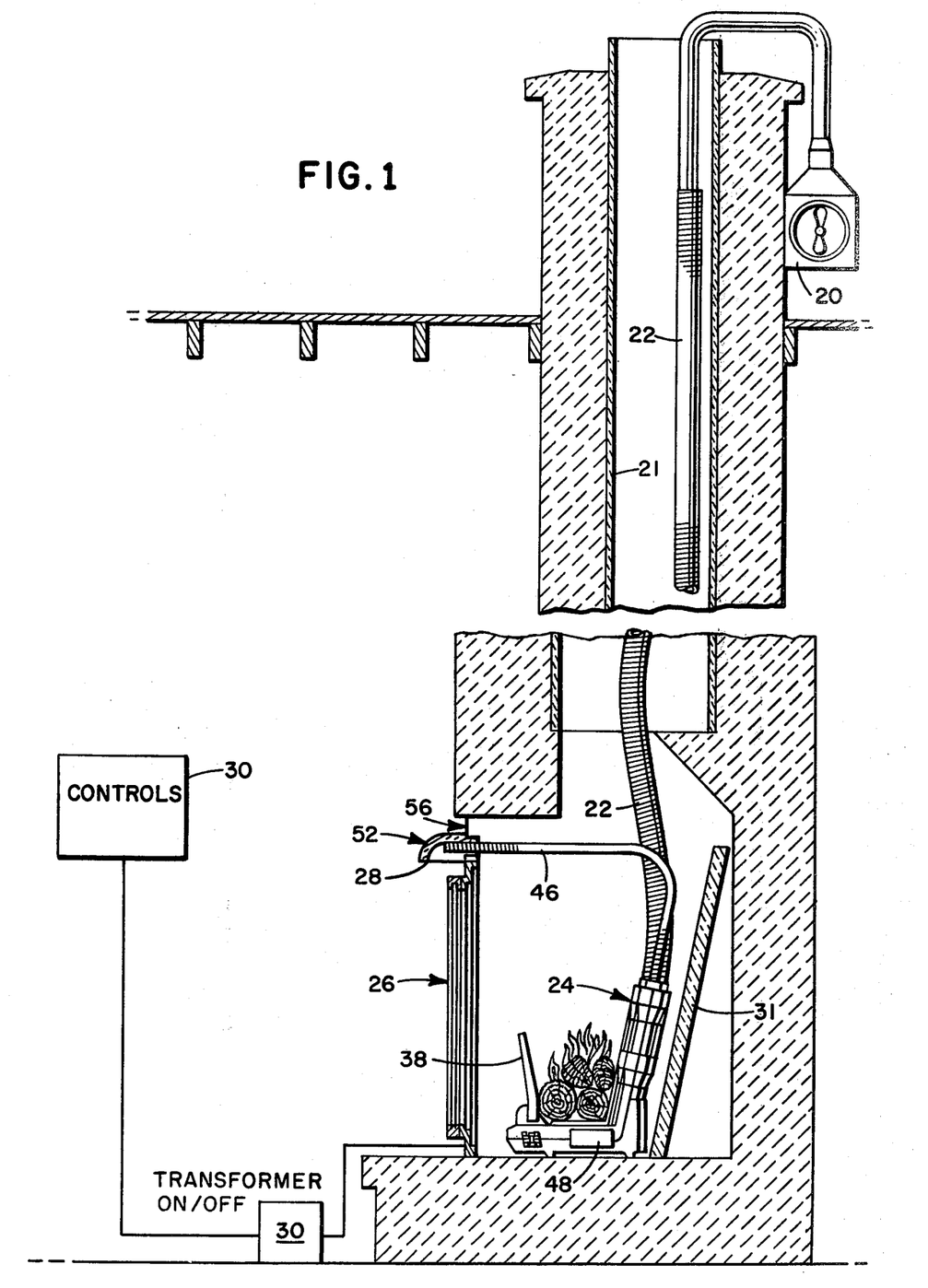
FIG. 1 shows a cut away view of a fireplace using the combustion system of the present invention.

Referring to FIG. 1, the present invention basically comprises a blower 20, which is communicated to fireplace grate 24 by means of air inlet conduit 22 which, for example, extends through exhaust flue 21. Air outlet system 46 fluidly connects grate 24 with the interior of a structure. Closure 26 for the fireplace front substantially air-tightly seals the fireplace combustion chamber from the interior of the structure. Blower controls 30 are provided at the interior of the structure and are electrically connected to the blower by means of wires (not shown) which extend up the flue to the blower. The fireplace may also be provided with a heat reflector or insulating material 31 to further improve the efficiency of the fireplace.

Figure 2:
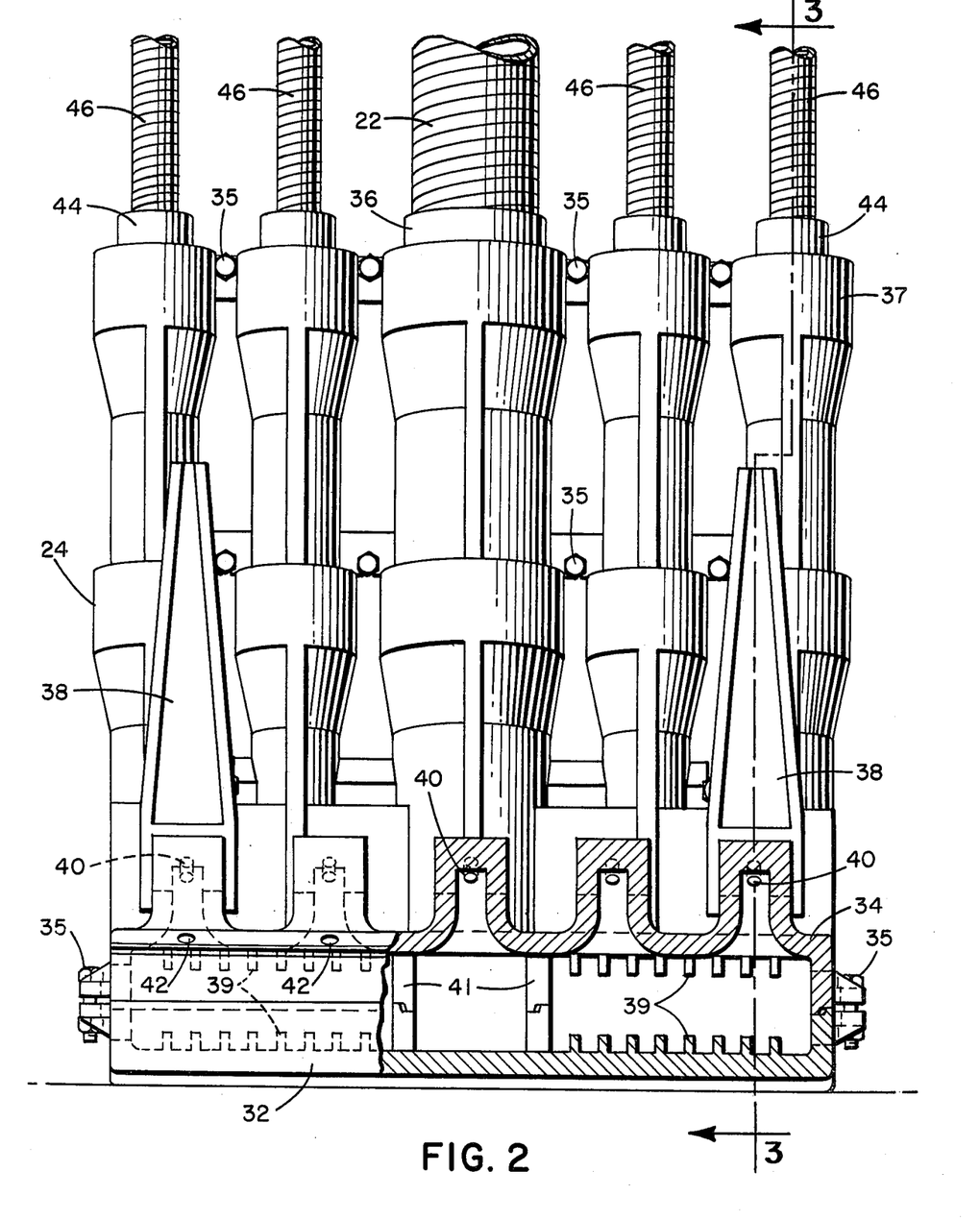
FIG. 2 shows a front view partially in section of the fireplace grate of the present invention.
Figure 3:
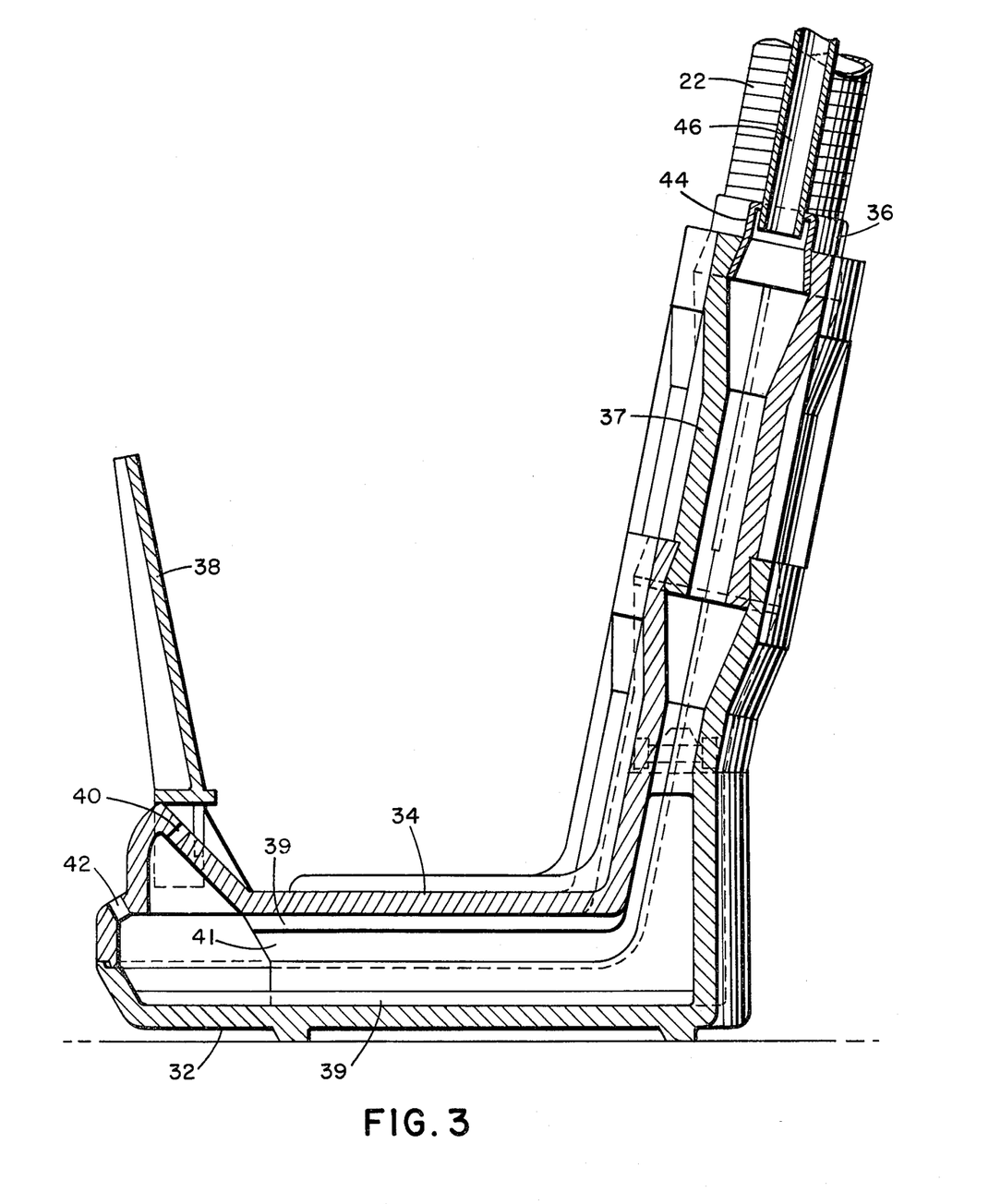
FIG. 3 shows a sectional side view of a grate taken along line 3—3 of FIG. 2.
Figure 4:
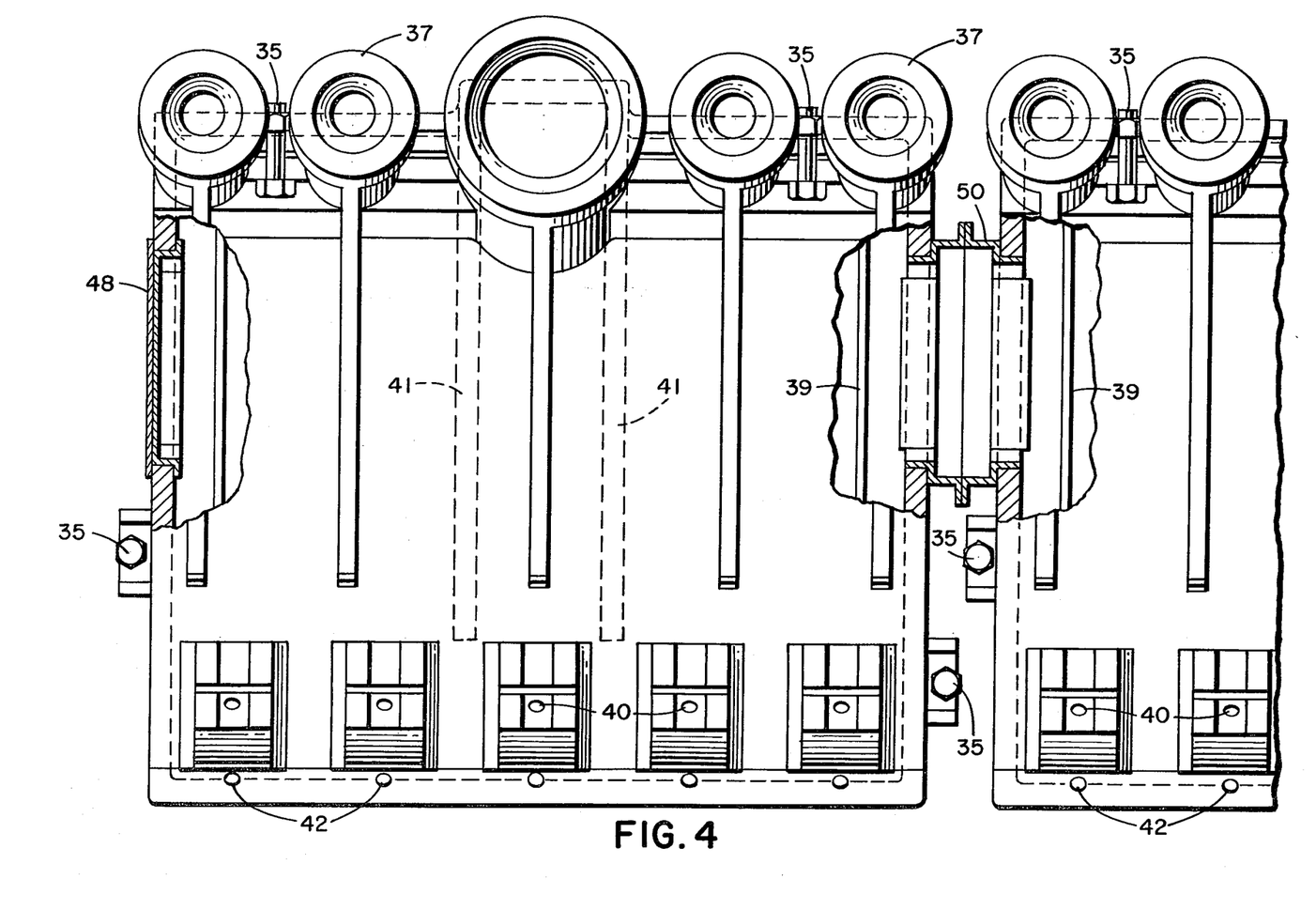
FIG. 4 shows a partially sectional plan view of the grate of FIG. 2.

The grate is shown in detail in FIGS. 2 through 4. The grate comprises bottom and top sections 32 and 34 held together, for example, by means of bolts 35. The height of the grate may be increased by use of an extender 37. As can be seen in FIG. 3, the bottom of the extender is held by the top of the grate. The top of the extender in turn holds air outlet connector 44, into which the air outlet conduit 46 extends. Similarly, an air inlet connector 36 is provided to hold air inlet conduit 22. As can be seen, the connectors 36 and 44, as well as bottom portions of the extender 37, have a bell-shaped configuration. Each conduit is preferably made of a flexible, wrapped steel type of tubing, which may be screwed into the connectors 36 and 44. Other means of connection would also be feasible. Also, if a shorter grate is desired, the connectors 36 and 44 may be used without the extender 37. It is preferred that the grate comprise top and bottom sections which are bolted together.

Figure 5:
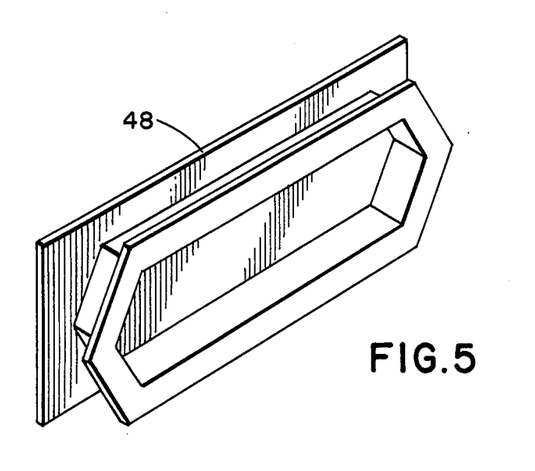
FIG. 5 shows a perspective view of a base plug for the fireplace grate.
Figures 6, 7:
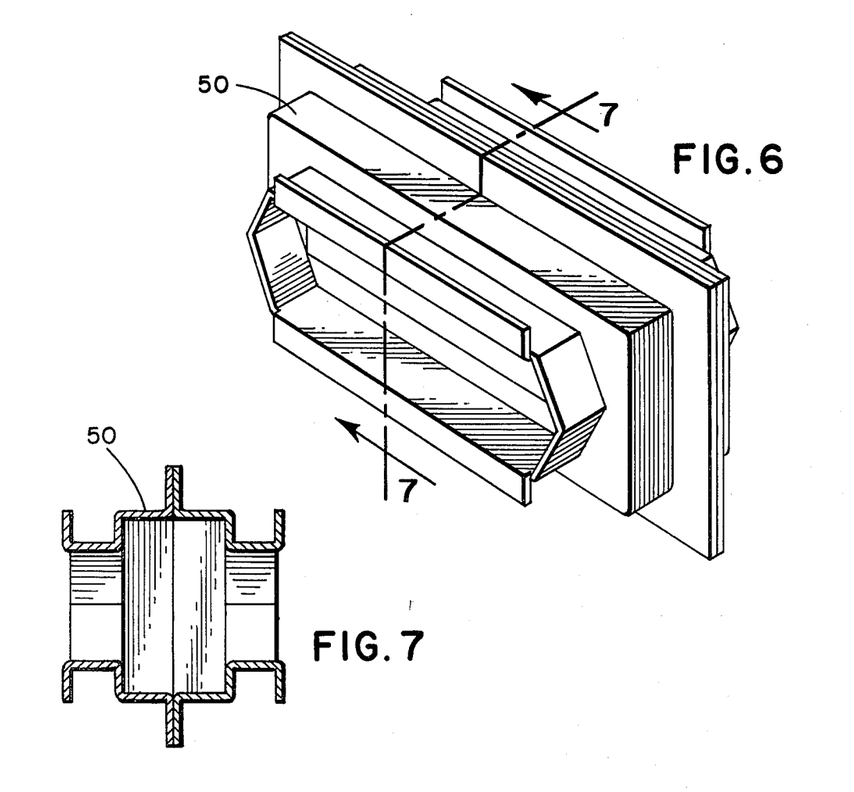
FIG. 6 shows a perspective view of a base connector for the fireplace grate.
FIG. 7 shows a sectional side view of a base connector taken along line 7—7 of FIG 6.
Figure 8:
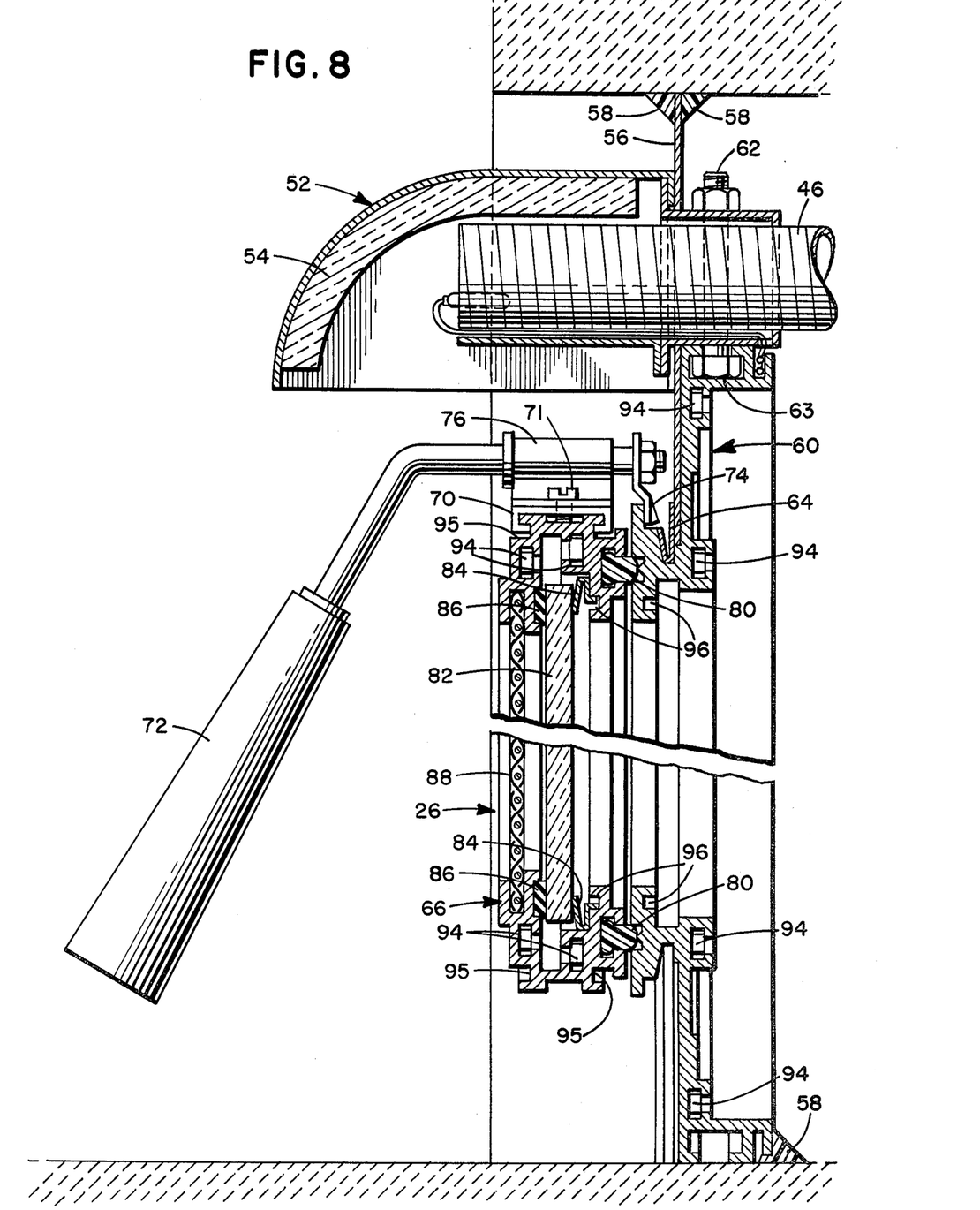
FIG. 8 shows a sectional side view of the air outlet and door system of the present invention.

The front of the grate is provided with andirons 38 and air holes 40 and 42, which will be more fully described later. Preferably, the andirons are formed and positioned so as to deflect air from holes 40 into the fuel, but not so that they block the air holes. The andirons can fit into slots cut into the grate. It is also desirable to use a base plug 48 and/or a base connector 50 (illustrated in FIGS. 5–7) as shown in FIG. 4. In corner fireplaces using a side closure, the base plug may be supplied with openings which serve the same function as air holes 42.

The air inlet conduit is in communication with a first air passage in the interior of the hollow grate. The air outlet conduits 46 are in communication with second air passages. The first and second air passages are connected by a communicating passage disposed across the front of the grate. The interior of the grate may be provided with means to increase the interior surface area of the grate (for example ribs 39 along the length of the air passages) for increased heat exchange.

Referring to FIGS. 1 through 4, air from blower 20 is forced down conduit 22 and through the first air passage. More than one conduit 22 could be present, depending on the number of grate sub-assemblies used. A plurality of grate sub-assemblies could be connected using connectors 50. If it is not desired to use each air inlet, the unused inlet would be plugged. The air is then forced to the front of the grate via partitions 41 where part of the air exits through hole 42 to provide a flow of air onto the glass of the closure 26. This keeps the glass free from soot and lessens temperature differentials across the glass, which can cause shattering of the glass. Part of the air exits through hole 40 to provide combustion air for fuel location in the grate. The rest of the air flows outwardly and then through the second air passages and towards the back of the grate to exit through outlet conduit 46 into the structure to be heated. Thus, the air travels the length of the grate twice, increasing the amount of time that the air is contacted with the hot grate to increase the temperature of the air. This could also be accomplished by forming the air passages in a serpentine or maze-type structure. The grate structure is preferably made of cast iron to retain heat and avoid deformation.

The grate could probably be more inexpensively made by using bent steel tubes. This construction, although inexpensive, would probably tend to warp with use and would provide little heat retention. It would, however, be operative. Two molded halves allows the use of automated mold machinery.

Referring to FIGS. 1, 8 through 10 and 13, the outlet conduits 46 are held in a housing 52, which extends through flange 56. The space between the housing and the conduit termination is preferably packed with an insulating material 54, such as mineral wool. It could be advantageous to provide a system for moistening the insulating material to provide a humidifying effect for the heated air. A holding tank disposed above the housing 52 fluidly connected to the insulation through the housing could serve this purpose. The flange also abuts the sides of the fireplace opening, and is provided about its periphery with a sealing gasket 58 made of materials such as silicone.

Figure 10:
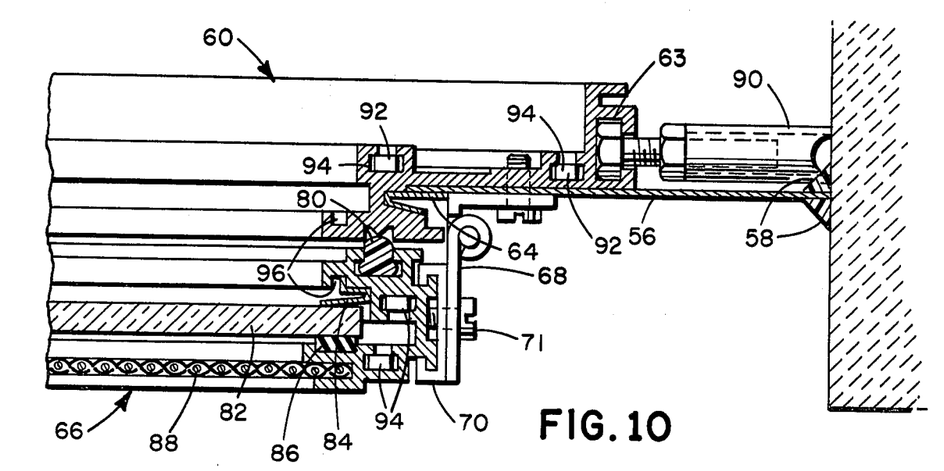
FIG. 10 shows a sectional top view of the door system taken along line 10—10 of FIG. 9.
Figure 11:
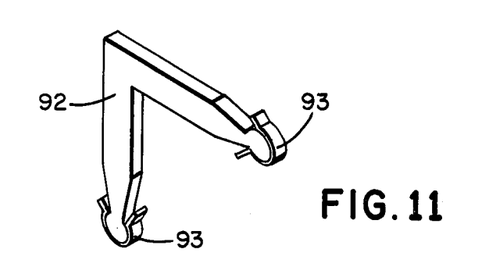
FIG. 11 shows a perspective view of a frame connector which may be used in the present invention.

The flange is held on an extruded metal frame piece 60 by means of a spring clamp 64. The housing 52 is held in place by bolt 62, which is located in recess 63 of the extruded frame piece 60. As can be seen in FIG. 10, this frame piece is firmly held in the fireplace by means of a plurality of sleeved bolts 90. It is preferred that these sleeve bolts 90 be provided on both sides of the closure 26 and optionally on the top and bottom. This provides pressure against both sides of the fireplace to hold the frame in place. It should be noted that the sleeve bolt 90 cooperates with a recess 63 as does bolt 62 which is used for holding housing 52 in place.

Figure 9:
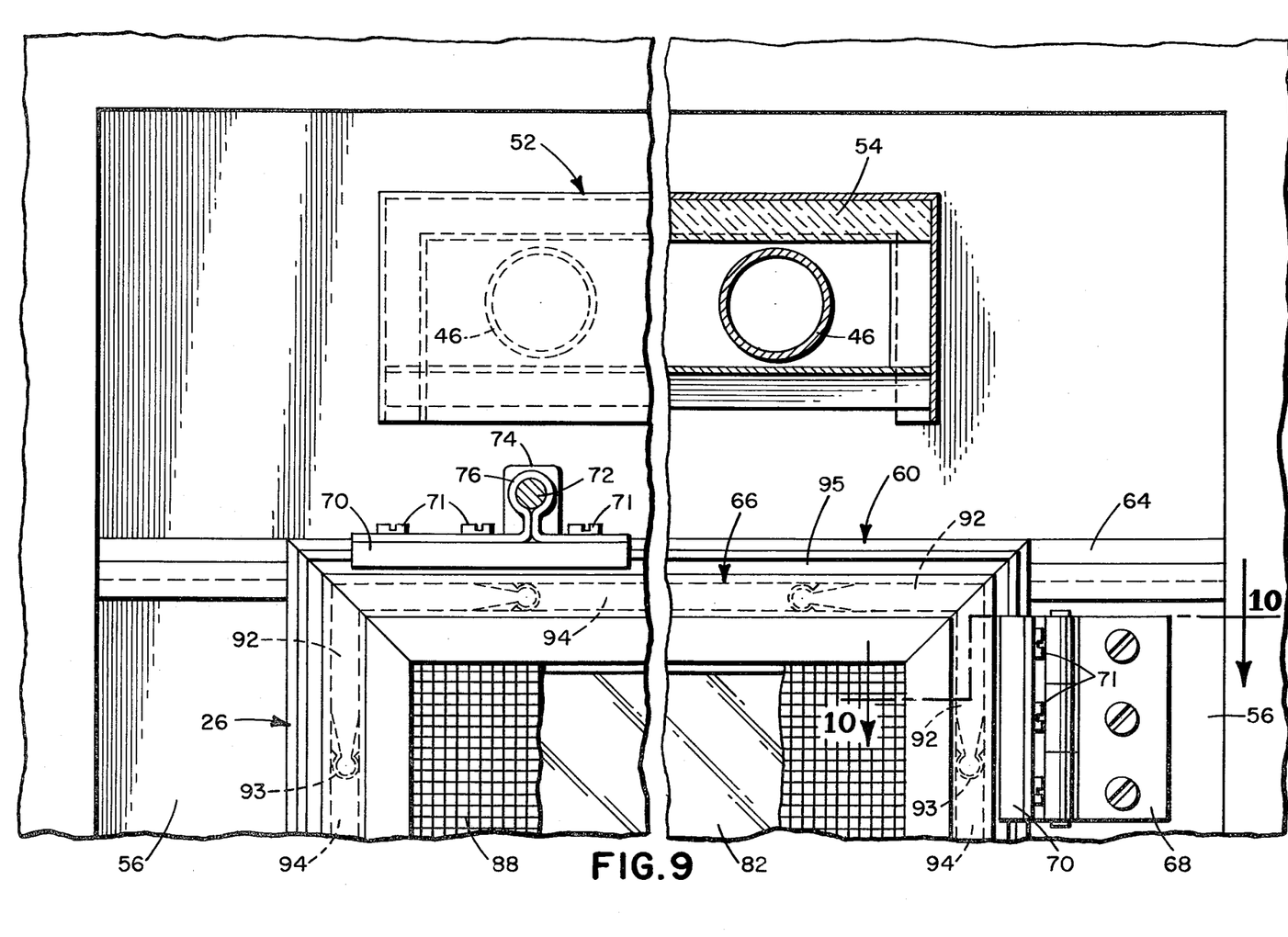
FIG. 9 shows a front view partially in section of the air outlet and door system of the present invention.
Figure 12:
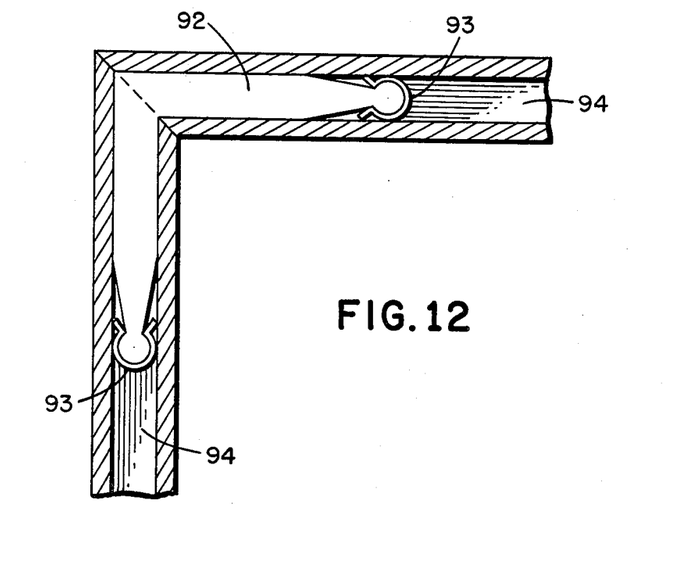
FIG. 12 shows a front view of part of the door system of the present invention showing the connector of FIG. 11 in place.
Figure 13:
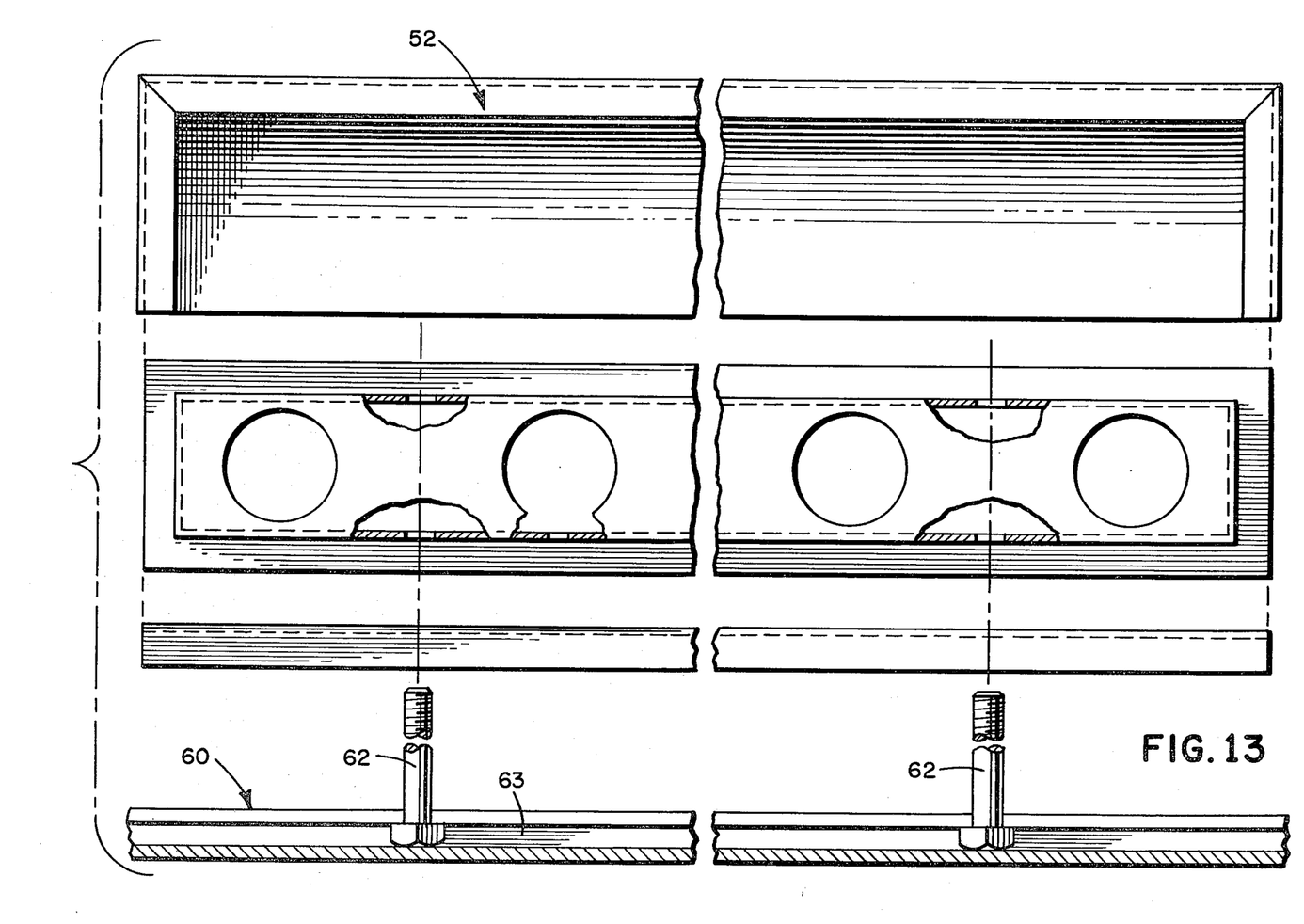
FIG. 13 shows a partially sectional rear view of the air outlet system of the present invention.

Extruded door frame 66 is attached to the extruded frame piece 60 by means of hinges 68. The hinges are bolted to the frame piece 60 and are connected to the door frame 66 by turning bolts through connector 70, which tightens against grooves 95 in the door frame. At this point, it should be noted that it is expected that four separate sections of frame piece 60 for each closure and four separate sections of door frame 66 for each door will be provided. These will be held together by a plurality of L shaped members 92, having spring members 93. These L shaped members will be disposed in grooves 94 on each extruded piece to hold the extruded pieces together at corners, as shown in FIGS. 9 and 12. Both frame piece 60 and door frame 66 are preferably made of an extrudable metal such as aluminum.

It should be noted that the frame piece 60 is composed of two relatively large sections (one supporting the flange and one providing the surface against which the doors close) connected by a narrow neck. The "flange" section insulates the "door" section from heat, while the narrow neck restricts transfer of heat. This reduces the amount of heat reaching the "door" section, preventing warpage of the surface against which the doors close.

It is expected that a series of standard frame and door sizes could be provided. Minor dimensional variations between individual fireplaces would be accomodated by trimming flange 56 to an appropriate size. In this regard, it would be advantageous to make the flange of a sheet metal such as sheet steel. Custom sizes could easily be produced by cutting the extruded material to length and assembling in the usual manner, thus reducing the expense associated with fabricating for unusual situations. Also, fixed glass sections could be produced from the same materials for use in corner fireplaces requiring a side closure in addition to closure 26. In this situation, the door frame 66 could be attached to frame 60 by use of a clamp (not shown) disposed in grooves 96. Flange 56 could be bent lengthwise to form a corner connecting front and side closures.

Returning to FIGS. 8 through 10, a sealing gasket 80 is provided between the extruded frame piece 60 and the extruded door frame 66. This sealing gasket can be advantageously made of a fiber such as type E fiber glass, formed into a rope. A tempered glass window 82, which is held in place by spring clamp 84, can be provided for the door frame. A second sealing gasket 86, made out of materials similar to that of gasket 80, may be provided for the window. It is also preferred that a metal screen 88 be provided to reduce the possibility of fire in the event of glass failure, and the likelihood of any breakage of glass 82 due to physical shock. Breakage is further minimized by having the air from outlet conduit 46 directed downwardly so that hot air runs across the front of the glass. Thus, heated air from the grate is supplied to both sides of the glass. This tends to minimize the temperature differential across the glass (see the discussion of air hole 42 above) and between the two sides of the glass, and also reduces the likelihood of a cold draft striking the glass.

A door handle is attached to the door frame 66 by means of mounting 76. The mounting is bolted to connector 70, which is attached to the extruded door frame in a manner similar to that discussed above. A latch 74 is provided at the end of the handle for cooperating with a protrusion on the frame piece 60. The latch has a general configuration of an angled flange which allows the door to be tightly held against the frame through gasket 80.

The blower is started by means of a switch which activates a transformer to convert house alternating current into direct current to drive the blower. In general, the controls comprise a thermostat, a flue gas temperature sensor located above the combustion chamber and an air outlet temperature sensor located near the point where hot air from outlet conduit 46 enters the structure to be heated. The wires from the transformer to the blower, the flue temperature sensor, and the air outlet temperatures sensor extend through a hole in the flange 56 which can be sealed by a gasket. Initially, the closure 26 should be opened when starting the fire to allow a steady blaze to develop. After a steady fire is burning, the doors may be closed and the controls for the blower may be turned on.

In a preferred embodiment, a thermostat is provided for setting a desired room temperature. In this preferred embodiment, the speed of the blower is directly and linearly related to the difference between the actual and desired room temperatures. Thus, the greater the difference, the greater the blower speed. Of course, when the doors are closed, the fireplace is fluid-tightly sealed from the interior of the structure to be heated, and air from the blower provides the primary combustion air for the fire. Thus, increasing the blower speed increases the combustion of the fire and also increases the volume of hot air being expelled into the structure to be heated. When actual and desired room temperatures coincide, the blower is set to run at a certain minimum speed to maintain combustion.

It is also advantageous to provide that when the temperature sensed by the sensor located near the outlet of conduit 46 drops below a pre-set minimum (which indicates consumption of much of the fuel in the grate), the blower will run at high speed, putting the maximum amount of warm air into the room, and providing a maximum amount of combustion air for the next fuel loading. The transformer box may also be provided with an indicator light to warn the users that more fuel is needed. When the temperature sensed by the sensor near the outlet of conduit 46 drops below a lower pre-set minimum (indicating consumption of all fuel and virtually complete removal of heat from the grate) the blower is automatically shut off. This lower pre-set mimimum may not be achieved immediately upon starting the blower at the beginning of a new heating cycle, so it is advantageous to assign a reset capability to the on/off switch which allows at least one full minute of blower operation before the low limit shut off feature begins to function. The flue gas temperature sensor serves as a safety device, which provides a signal to shut the entire system down when the flue gas temperature reaches approximately 500° C., representing a safety hazard.

Figure 14A:
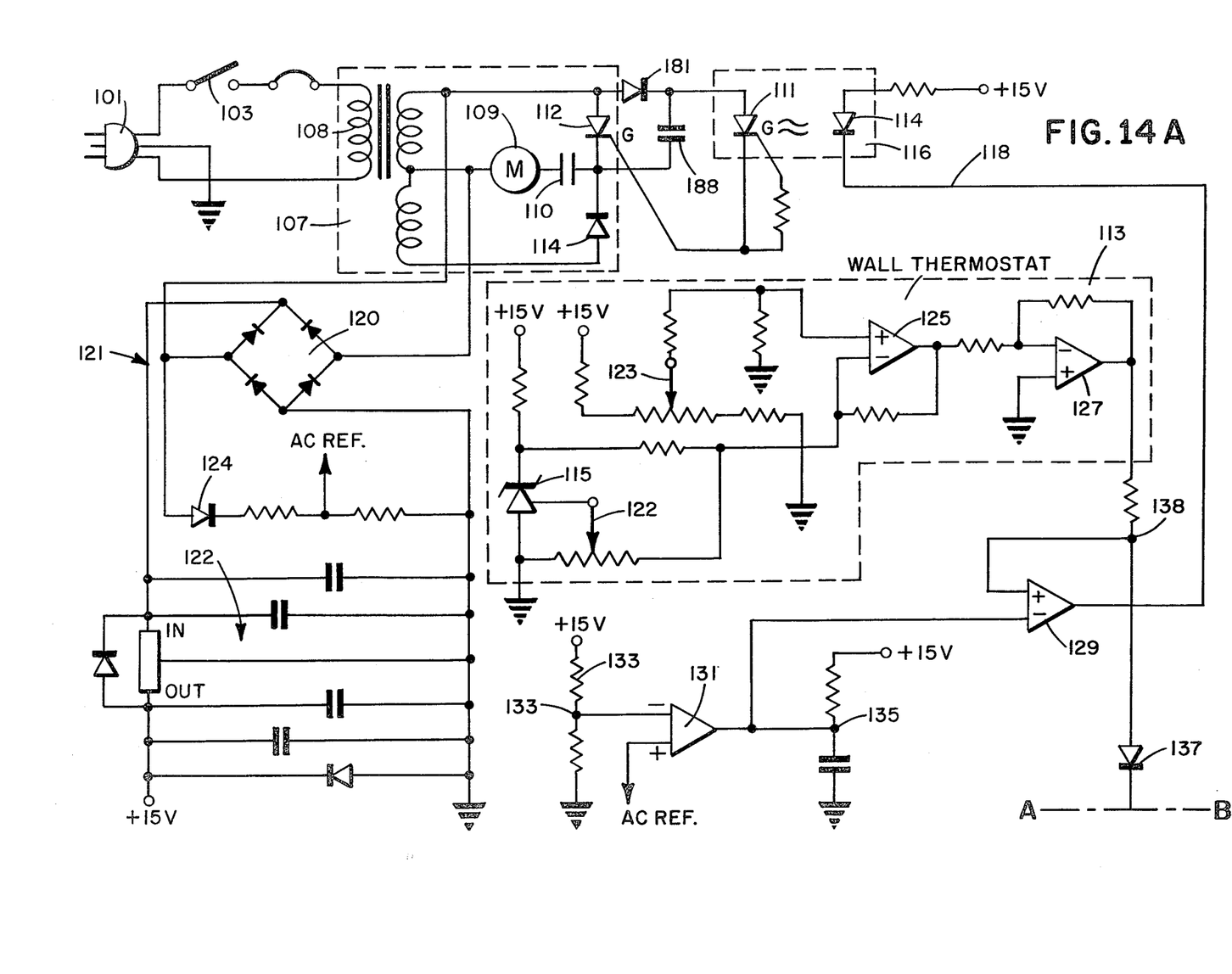
FIGS. 14a and 14b are electrical schematic drawings of blower controls for the present invention.
Figure 14B:
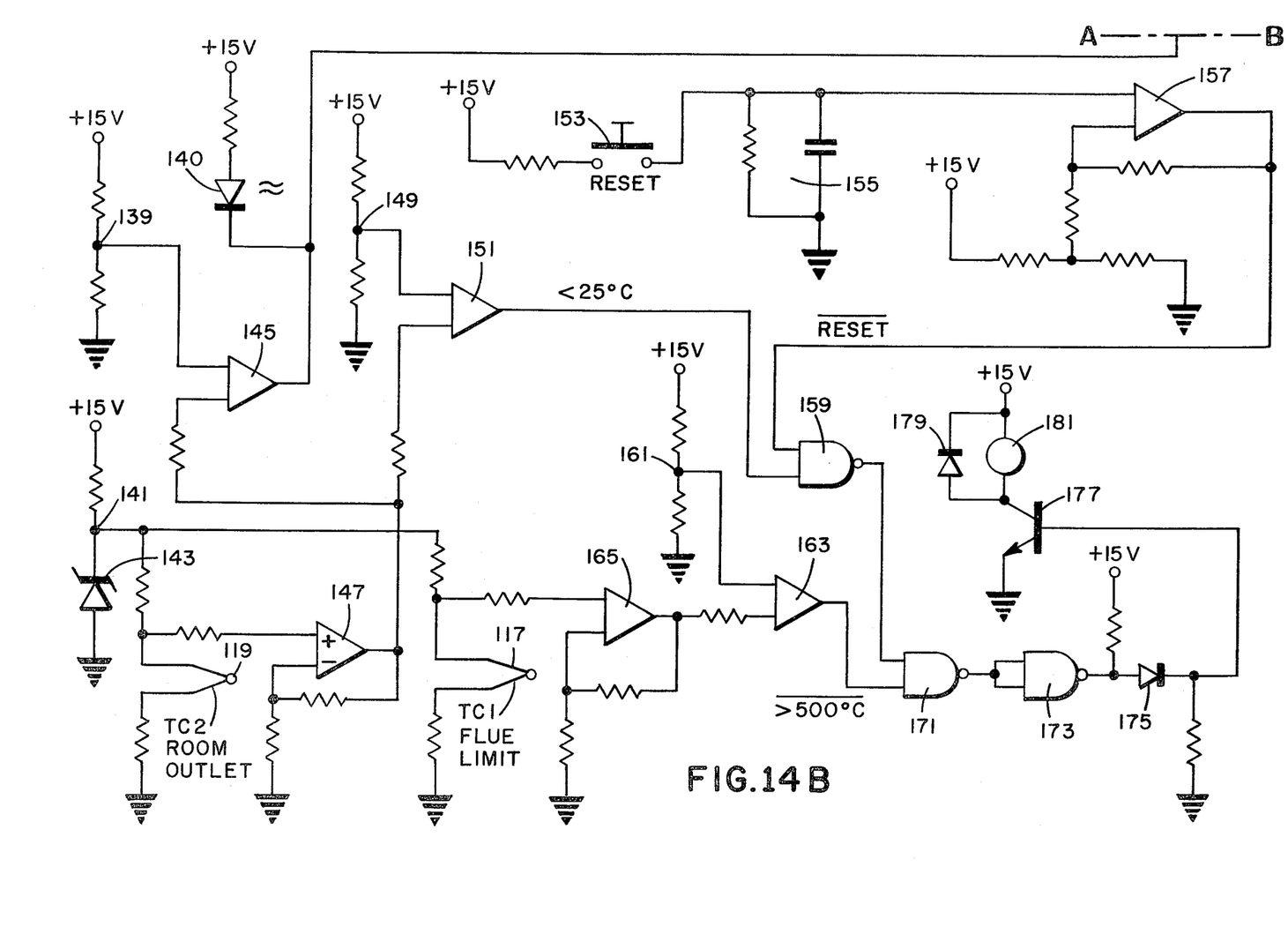

A control system for carrying out the functions described above is shown in FIGS. 14a and b. Power for the blower motor is received at a plug 101 which is connected through a line switch 103 and circuit breaker 105 to a transformer/rectifier circuit 107. AC power supplied to the primary of a center tap transformer 108 provided within the transformer/rectifier circuit 107 is stepped down to an operating voltage for a blower motor 109. This operating voltage is supplied through rectifiers 112 and 114 and through the contacts 110 of a relay to one side of blower motor 109, while the other side of blower motor 109 is directly connected to the center tap of transformer 108. Rectifier 112 is a silicon control rectifier (SCR) wherein the on/off period thereof can be controlled by a signal applied to its control gate. This gate signal is taken at an output of an optically controlled silicon control rectifier 111 which receives a light control signal from the output of light emitting diode 114. Silicon controlled rectifier 111 and light emitting diode 114 together collectively form a conventional opto-isolator circuit 116. Power to silicon control rectifier 111 is supplied by a rectifier/storage circuit consisting of diode 181 and capacitor 182 which are connected across one of the secondary windings of transformer 108. A control signal supplied on line 118 to energize light emitting diode 114 will in turn control the passage of current through silicon control rectifier 111 which in turn controls the passage of current through silicon control rectifier 112.

Rectifiers 112 and 114 are arranged such that the voltage outputs thereof sum. Accordingly, when only rectifier 114 is operating a first voltage V is applied to blower motor 109 through relay contacts 110. However, when both rectifier 114 and silicon control rectifier 112 are conducting a voltage 2V is supplied to motor 109. In this way as long as contacts 110 are closed, motor 109 will always operate at some minimum speed by virtue of the voltage supplied through rectifier 114, and will operate at some higher speed in accordance with voltage supplied through silicon controlled rectifier 112, the actual higher speed being determined by the amount of time controlled rectifier 112 is "on" as determined by the control signal supplied on line 118 to light emitting diode 114.

To supply low voltage DC power to the various circuits of the control system, a power supply circuit is provided which is connected across one of the secondary windings of transformer 108. This power supply circuit 121 includes a full wave bridge rectifier 120 which rectifies the AC voltage at the output of transformer 108 to a direct current (DC) voltage, and a filter and voltage regulator circuit 122 which smooths the DC output to provide the operating power for the various circuits of the control system. A diode rectifier 124 is also connected to the output of transformer 108 to provide a rectified AC reference signal (the magnitude of which varies over one polarity only) which is supplied to the input of a switching comparator 131, the purpose of which will be described more fully below.

The control signal line 118 is connected to the output of a switching comparator 129 which receives as one input the output signal of wall thermostat 113 and, as another input, the output of switching comparator 131. The output of switching comparator 131 is also connected to the midpoint of an RC circuit 135 which is connected across the DC low voltage power supply. Switching comparator 131 has one input connected to receive the AC reference signal and another input connected to a biasing circuit 133. Switching comparator 131 is arranged such that whenever an applied AC reference signal exceeds a threshold level, as set by the biasing circuit 133, the output thereof releases from ground (unclamps) the capacitor of the RC circuit 135 allowing the capacitor to charge. Thus, on each cycle of AC reference voltage applied to switching comparator 131, the capacitor of the RC network 135 will be grounded at some point in the cycle. When the capacitor of the RC network 135 is not grounded the capacitor begins to charge in ramp-like fashion so that the net effect of switching comparator 131 and RC circuit 135 is to generate a train of ramp-like signals which are applied to one input of switching comparator 129. Switching comparator 129 operates such that whenever the ramp-like voltage applied thereto from the output of switching comparator 131 exceeds the threshold level set by the other input thereto, an output signal is generated on control signal line 118. The other input to switching comparator 129 is taken from a node 138 which is connected to the output of wall thermostat 113 and to one side of a diode 137.

Wall thermostat 113 includes a temperature sensing diode 115 connected across a low voltage DC supply. A calibration potentiometer 122 is provided to calibrate the output voltage of temperature sensor 115 and the output of temperature sensor 115 is connected as one input to differential amplifier 125. The other input to differential amplifier 125 is taken from a temperature setting potentiometer 123.

The magnitude of the output signal from amplifier 125 will be determined by the magnitude of the voltage difference between the output of temperature sensor 115 and that of potentiometer 123. The output signal of differential amplifier 125 is applied to an inverter 127 and from there to node 138 where it serves as an input to switching comparator 129. Accordingly, whenever heat is called for as determined by differential amplifier 125 an appropriate output signal is fed as one input to switching comparator 129, the amplitude of this output signal being determined by the magnitude of the difference between a set temperature and an actual temperature. This signal appearing at node 138 and at the input of switching comparator 129 sets the threshold level at which switching comparator 129 will switch when the ramp signal from the output of switching comparator 131 is applied thereto. In other words, the magnitude of the signal at node 138 provided by the wall thermostat 113 will determine the amount of time a signal will exist at the output of switching comparator 129 for each ramp-like signal supplied thereto from the output of switching comparator 131. This "on" time on line 118 determines the "on" time of silicon control rectifier 111 which in turns determines the "on" time of silicone control rectifier 112 and thus the speed of blower motor 109.

Node 138 also is connected through diode 137 to the output of a switching comparator 145. Switching comparator 145 functions in a manner similar to switching comparator 131 in that it provides an output ground signal, that is a grounds node 138 through diode 137 whenever switching comparator 145 turns on. One input to switching comparator 145 is a bias voltage taken from voltage divider 139 and the other input thereto is taken at the output of an amplifier 147 which in turn receives an output from a room outlet temperature sensor 119. Room outlet temperature sensor 119 and amplifier 147 are connected to a voltage reference circuit 141 and cooperate to provide a signal representative of the outlet temperature of the stove at the output of amplifier 147. The output of amplifier 147 is applied as the input to switching comparator 145. The biasing of the other input to switching comparator 145 by voltage divider 139 is such that switching comparator 145 provides a ground signal to node 138 whenever the temperature sensed by the room outlet temperature sensor 119 is less than 200° C. Accordingly, whenever the outlet temperature of the stove is less than 200° C. the room thermostat output provided to node 138 is effectively channeled to ground by switching comparator 145 and thus has no effect at the input to switching comparator 129. Accordingly switching comparator 129 will turn "on" for virtually the entire duration of each ramp-like signal applied at the input thereto, thus running the blower motor 109 at its maximum speed. A light emitting diode 140 will turn on whenever switching comparator 145 grounds any signal appearing at node 138.

The output of amplifier 147 representing the room outlet temperature is also fed as an input to a switching comparator 151 which receives at another input a biasing voltage from voltage divider 149. The biasing of switching comparator 151 is such that it only provides an output signal (ground) sufficient to enable NAND gate 159 whenever the room outlet temperature is greater than 25° C. If the room outlet temperature is greater than 25° C., switching comparator 151 will provide ground signal to NAND gate 159 enabling it to provide an appropriate output signal to NAND gate 171 which supplies its output through NAND gate 173 and diode 175 to transistor 177 which, when turned off deactuates a coil 181 of a relay causing contacts 110 to open, thereby interrupting the supply of power to blower motor 109. Accordingly, whenever the room outlet temperature falls below 25° C., transistor 177 is turned off and contacts 110 open and the blower motor is inoperative.

NAND gate 171 also has another input thereto which will also cause transistor 177 to turn off and de-energization of relay coil 181. This other input signal 181 originates from a flue limit temperature sensor 117 which provides an output signal to the input of amplifier 165 representative of the temperature in the flue. This flue temperature is provided as one input to switching comparator 163 which receives at its other input the output of a voltage dividing circuit 161 which sets a threshold limit of 500° C. Accordingly, when the output of the flue limit temperature sensor 117, as applied as a signal to the switching comparator 163, exceeds 500° C., an output signal will be produced activating NAND gate 171 and causing transistor 177 to turn off through NAND gate 173 and diode 175 in the manner described earlier. Thus, contacts 110 of the relay will be opened disabling the blower motor whenever the room outlet temperature is less than 25° C. or the flue temperature is greater than 500° C. Moreover, as described earlier, the thermostat is overridden by sinking to ground the output signal thereof at node 138 whenever the room outlet temperature as sensed by sensor 119 is less than 200° C. As a result, thermostatic control of the stove occurs whenever the room outlet temperature is greater than 200° C. and the flue temperature is less than 500° C. Within this range, the output of wall thermostat 113 will control the speed of blower motor 109 according to the difference between the temperature set into the thermostat and the actual room temperature as sensed by room temperature sensor 115.

Since there may be times when it is desired to operate the blower motor even though the room outlet temperature is less than 25° C., a reset circuit is provided as another input to NAND gate 159. This reset signal will cause NAND gate 159 to supply a signal which turns on transistor 177 even if the output signal from switching comparator 151 is such as to indicate that the room outlet temperature is less than 25° C. which would normally call for transistor 177 to turn off and an opening of contacts 110 and the interruption of operation of the blower motor. The reset circuit comprises a momentarily reset switch 153 which, when closed, charges a capacitor of RC circuit 155. The voltage charge on the capacitor will gradually diminish at a rate determined by the RC time constant, but while it persists it is supplied through amplifier 157 as a reset signal. Accordingly, when switch 153 is pressed momentarily, a reset signal is supplied to the input of NAND gate 159 for a duration determined by the RC time constant of circuit 155. This reset signal will cause transistor 177 to turn on thus permitting the blower motor to operate for the duration of time set by the time constant of RC circuit 155 even though the room outlet temperature is less than 25° C.

The combustion system described above for a fireplace would also be useful for free standing stoves. It is contemplated that closure 26 or its equivalent would often already be provided in such stoves. It is also expected that the grate top extender 37 and andirons 38 would also not necessarily be used in a stove. It is contemplated that a section of standard stove pipe would be replaced with a section having holes for accomodating the outlet conduits 46 and the wires to the blower and flue temperature sensor. Any disadvantage presented by having flue space taken up by conduit 22 and a plurality of conduits 46 disposed in the flue pipe are alleviated by the fact that the damper in the flue pipe could be eliminated.

The invention described above thus provides the following advantages. By using the existing flue as the means for supplying outside air, it is possible to provide simple installation without tampering with any of the walls of either the combustion chamber or the enclosure in which it is located. By disposing the blower 20 at the top and outside of the chimney, the annoyance of noise from the blower is eliminated from the room being heated. Soot and creosote cannot gum up the workings of the blower, nor can high temperatures shorten its life, since it is disposed outside of the chimney. The entire length of the chimney can be used for heat exchange for conduit(s) 22. The massive iron grate provides a good heat sink for heating the air from the blower, storing heat beyond the effective life of the fire and for also providing radiant heat through the glass doors. Providing air hole 40 in the grate makes it possible to provide a truly automatic control system which efficiently and accurately delivers combustion air to the fuel in the grate. Air hole 42 helps keep the glass and the doors free from soot and, in conjunction with the downwardly directed outlet of assembly 52, helps reduce temperature differentials across the glass, reducing the possibility of breakage.

By providing that the front of the fireplace is fluid-tightly sealed, warm air from the room is not allowed to escape up the chimney. Optionally, manual draft controls could be provided in the flange around closure 26 to allow a fire to burn even in the case of a power outage. The present invention allows circulation of fresh, outside air into the structure heated and also provides a positive pressure situation which reduces cold drafts into the structure and enhances even distribution of thermal energy throughout the structure.

The embodiments illustrated have been conceived to allow an efficient manufacturing process, easy replacement of worn parts and relatively simple installation. For example, the grate is shaped so as to be readily molded from cast iron. The air outlet system of FIG. 8 can be easily replaced when necessary.

A less intricate blower control system could also be provided. Instead of providing a blower having an infinite number of speeds which directly and linearly vary with the difference between an actual and desired room temperature, a blower having, for example, three specific speeds could be provided and could also be controlled manually rather than automatically. Furthermore, a single or multiple speed blower could be provided having only a cutoff when the outlet conduit air temperature goes below 25° C.

Although a specific embodiment has been described above, variations in this embodiment may of course be made without departing from the spirit and scope of the present invention, which is defined in the following claims. For example, in new constructions, the blower and the controls could be built in. A basket could be provided to allow for burning coal. Other routes could be found for connecting the blower and grate air inlet.

Additional openings could be provided in the grate or conduits to provide secondary combustion air, if necessary, to further reduce emissions.

The use of catalytic combustors in conjunction with this invention is possible, and may in fact improve the performance of such devices by virtue of the higher flue gas temperatures developed by the present invention.

What is claimed is:

1. A solid fuel burning apparatus for use in an enclosure having an exhaust flue, a combustion chamber, and a fuel-loading opening, comprising:
    means for substantially air-tightly sealing the fuel-loading opening;
    a hollow, fuel-holding grate having an air inlet opening thereinto at the rear thereof, a first air outlet opening therefrom through which air is directed directly toward the fuel, and a plurality of second air outlet openings therefrom at the rear of the grate through which air is fed exterior of said combustion chamber into the enclosure, said grate having air passage means therein fluidly connecting said inlet to said first and second outlets;
    a single variable speed blower means outside of said enclosure, said blower means having an air inlet and an air outlet, the air inlet of said blower means being below the level of the outlet of said exhaust flue;
    a first flexible conduit extending through said exhaust flue, said flexible conduit directly fluidly connecting the air outlet of said blower means and said grate air inlet;
    a plurality of second flexible conduits each directly fluidly connecting a respective one of said second air outlets and said enclosure through said air-tightly sealing means; and
    said passage means extending forwardly from said grate air inlet to adjacent the front of said grate and from there extending rearwardly to said second air outlets so that air moving through said passage means to the exterior of said combustion chamber into said enclosure is heated within said flue and within said passage means over a distance corresponding to at least the length of the flue plus twice the distance between the front of the grate and the second air outlets at the rear of the grate plus the length of the second flexible conduit.

2. An apparatus as claimed in claim 1, wherein said means for air-tightly sealing comprise glass sections.

3. An apparatus as claimed in claim 2, further comprising a third air outlet in said grate directed towards the glass sections of the means for air-tightly sealing.

4. An apparatus as claimed in claim 3, further comprising means disposed on the exterior of said combustion chamber for directing air from said second conduits toward said means for air-tightly sealing.

5. An apparatus as claimed in claim 1, further comprising an enclosure thermostat which controls the blower speed.

6. An apparatus as claimed in claim 5, wherein the speed of said blower means is linearly variable and the speed of said blower means decreases as the temperature sensed by said thermostat nears a third set desired temperature.

7. An apparatus as claimed in claim 6, wherein said blower means is set to run at a pre-set minimum speed when said temperature sensed by said thermostat meets or exceeds said third set desired temperature.

8. An apparatus as claimed in claim 1 or 5 further comprising a first temperature sensor located to sense the temperature of hot air from said grate when said hot air leaves said enclosure, which gives off a signal which shuts off said blower means when the temperature sensed decreases to a first preset low minimum temperature.

9. An apparatus as claimed in claim 8, further comprising a second temperature sensor located in said combustion chamber and emitting a signal to shut off said blower means when the temperature in said combustion chamber exceeds a second set temperature.

10. An apparatus as claimed in claim 9, wherein said first temperature sensor gives off a first signal to run said blower at high speed when the temperature sensed falls below a first minimum temperature which is greater than said low minimum temperature.

11. An apparatus as claimed in claim 1, wherein said grate is formed of top and bottom sections held together and is provided with connecting and extension means clamped between said top and bottom sections so additional grate components can be added.

12. An apparatus as claimed in claim 1, wherein said passage means comprises:
    a first air passage in fluid communication with said air inlet;
    a second air passage in fluid communication with said second air outlet; and
    a communicating passage fluidly connecting said first and second air passages.

13. An apparatus as claimed in claim 12, wherein said communicating passage is disposed across the front of said grate.

14. An apparatus as claimed in claim 13, further comprising a third air outlet in fluid communication with said communicating passage and directed towards said means for air-tightly sealing.

15. An apparatus as claimed in claim 1, further comprising means for increasing the interior surface area of said grate.

16. An apparatus as claimed in claims 1 or 2, wherein said means for air-tightly sealing comprises a door held by a frame and a flange extending from at least part of the periphery of the frame, the outer edge of said flange abutting said fuel loading opening.

17. An apparatus as claimed in claim 16, wherein said frame comprises a first section adjacent said flange and a second section against which said door closes, connected by a narrow neck.

18. An apparatus as claimed in claim 1, said second conduits extend above the grate.

19. A solid fuel burning apparatus for use in an enclosure having an exhaust flue, a combustion chamber, and a fuel-loading opening, comprising:
    means, comprising glass sections, for substantially air-tightly sealing the fuel-loading opening;
    a hollow, fuel-holding grate having an air inlet opening thereinto at the rear thereof, a first air outlet opening therefrom through which air is directed directly toward the fuel, a plurality of second air outlet openings therefrom at the rear of the grate through which air is fed exterior of said combustion chamber into the enclosure, and a plurality of third air outlets therefrom directed directly toward the glass sections of the means for air-tightly sealing, said grate having air passage means therein fluidly connecting said inlet to said first, second and third outlets;

a single variable speed blower means outside of said enclosure, said blower means having an air inlet and an air outlet, the air inlet of said blower means being below the level of the outlet of said exhaust flue;

a first flexible conduit extending through said exhaust flue, said flexible conduit directly fluidly connecting the air outlet of said blower means and said grate air inlet;

a plurality of second flexible conduits each directly fluidly connecting a respective one of said second air outlets and said enclosure through said air-tightly sealing means; and said passage means extending forwardly from said grate air inlet to adjacent the front of said grate and from there extending rearwardly to said second air outlets so that air moving through said passage means to the exterior of said combustion chamber into said enclosure is heated within said flue and within said passage means over a distance corresponding to at least the length of the flue plus twice the distance between the front of the grate and the second air outlets at the rear of the grate plus the length of the second flexible conduit.

* * * * *